E. C. CHAPMAN.
Stove-Pipe Dampers.

No. 144,192.                              Patented Nov. 4, 1873.

WITNESSES.

INVENTOR.

UNITED STATES PATENT OFFICE.

EDWIN C. CHAPMAN, OF LACON, ASSIGNOR OF ONE-HALF HIS RIGHT TO JAMES M. HORTON, OF CHICAGO, ILLINOIS.

IMPROVEMENT IN STOVE-PIPE DAMPERS.

Specification forming part of Letters Patent No. 144,192, dated November 4, 1873; application filed September 5, 1873.

*To all whom it may concern:*

Be it known that I, EDWIN C. CHAPMAN, of Lacon, in the county of Marshall and State of Illinois, have invented certain new and useful Improvements in Dampers for Stove-Pipes, of which improvements the following is a full, clear, and exact description, which will enable others skilled in the art to which my invention appertains to make and use the same, reference being had to the accompanying drawing, forming a part hereof, and in which—

Figure 1:
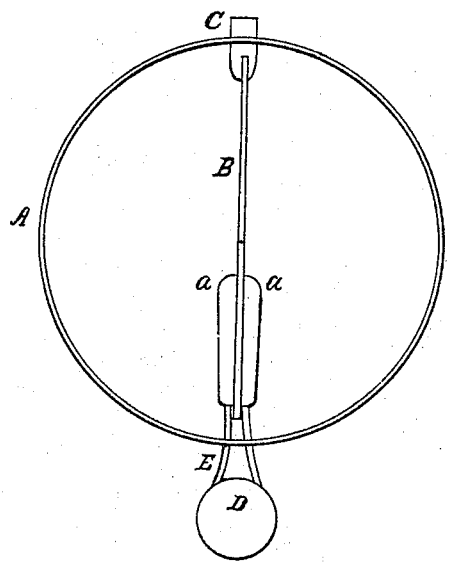
Figure 2:
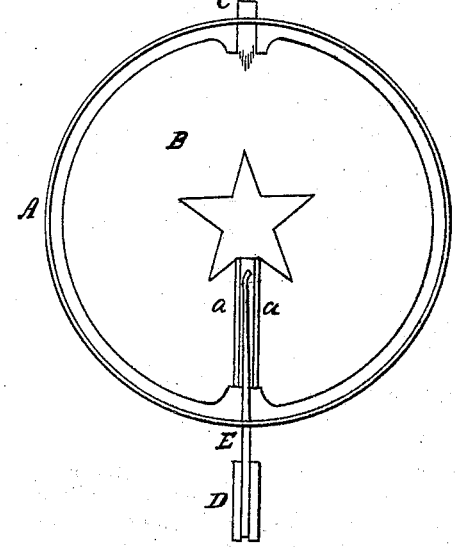
Figure 3:
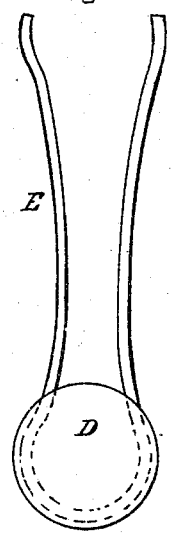

Figure 1 is a top view of a stove-pipe provided with my improved damper, and representing the damper when it is open; Fig. 2, a like view when the damper is closed; Fig. 3, a representation of damper-button and the means by which it is attached to the damper; and Fig. 4, a view in all respects like Fig. 1, excepting that a modification in the construction of the damper is shown.

Like letters of reference indicate like parts.

Figure 4:
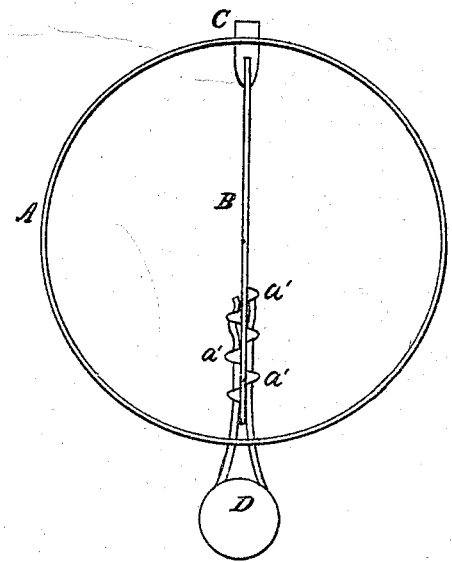

In the drawing, A represents a stove-pipe. B is the damper. This damper consists of a disk, which may be made either of cast-iron or of sheet metal, and it may either have a central opening, as shown in Fig. 2, for the purpose of allowing a moderate draft when the damper is arranged in the position there shown, or it may be somewhat less in diameter than the diameter of the pipe for the same purpose. C is a spindle extending freely through, and having a bearing in, an opening in the pipe. When the damper is cast, the spindle and damper may be cast together in one piece. *a a* are ribs extending from each face of the damper, as shown in Figs. 1 and 2, and when the damper is cast these ribs and the damper may also be cast together in one piece. The ribs, however, need not be continuous. When the damper is made of sheet metal, the spindle C may be attached to it in any suitable manner, and the equivalents of the ribs *a a* may be formed by striking or setting up the projections *a' a'* by means of a suitable instrument or die, as shown in Fig. 4. D is a button, by means of which the damper is operated. This button is preferably made of a material which is a poor conductor of heat; but the material of which it is constructed is not an essential feature of my invention. A groove is sunken into the periphery of the button, as represented in Fig. 3, and E is a metallic strip arranged in this groove, and bent in the manner, or approximating the form, shown in Fig. 3. It is not essential that the part E should be made of spring metal.

In order to attach the button to the damper so that the latter may be operated for the purposes for which it is intended, the free ends of the part E are passed through a hole in the pipe, and this hole is of such a size as to crowd the ends of the part E toward each other, and is arranged opposite the opening in which the spindle C rests. The part E is then pushed into the pipe until its arms enter the grooves or channels formed by the ribs *a a*, or by their equivalents, each arm entering a corresponding groove. The arms of the part E will then be retained in the grooves by reason of their contact with that part of the pipe through which they pass, but may be readily withdrawn therefrom.

It will be perceived, from the foregoing description, that the damper may be readily opened and closed by turning the button for that purpose. The arms E E, by reason of their contact with the pipe, will retain the damper in any position in which it may be set. It will also be perceived that the damper B, when constructed substantially as specified, whatever its size may be, will admit of being operated by means of any button D provided with a part, E, without respect to the length of the arms of the latter part. In other words, exact duplicates of the parts D and E, inclusive of the dimensions of these parts, may be employed for the purposes set forth, in connection with a damper constructed substantially as described, without regard to the size of the latter, and the object of my invention is to accomplish that result by means substantially the same as specified.

Having thus described my invention, what I claim as new, and desire to secure by Letters Patent, is—

The damper B, provided with the spindle C and with the ribs *a a*, in combination with the button D and the arms E, substantially as and for the purposes specified.

EDWIN CALVIN CHAPMAN.

Witnesses:
L. C. McMURTRIE,
JAS. M. HORTON.